United States Patent
Knauer

(10) Patent No.: US 11,840,287 B2
(45) Date of Patent: Dec. 12, 2023

(54) LEVER GEAR FOR A WHEEL WIND DEFLECTOR AND METHOD FOR OPERATING A LEVER GEAR WITH OVERLOAD PROTECTION

(71) Applicant: Magna Exteriors GmbH, Sailauf (DE)

(72) Inventor: Bernd Knauer, Stuttgart (DE)

(73) Assignee: MAGNA EXTERIORS GMBH, Sailauf (DE)

( * ) Notice: Subject to any disclaimer, the term of this patent is extended or adjusted under 35 U.S.C. 154(b) by 120 days.

(21) Appl. No.: 17/401,888

(22) Filed: Aug. 13, 2021

(65) Prior Publication Data
US 2022/0073155 A1 Mar. 10, 2022

(30) Foreign Application Priority Data
Sep. 10, 2020 (DE) .......................... 102020211399.8
Dec. 4, 2020 (DE) .......................... 102020215389.2

(51) Int. Cl.
*B62D 35/02* (2006.01)
*F16D 7/00* (2006.01)

(52) U.S. Cl.
CPC ............. *B62D 35/02* (2013.01); *F16D 7/005* (2013.01)

(58) Field of Classification Search
CPC ................................ F16D 7/005; B62D 35/02
USPC .............................. 74/89, 532, 529, 526, 519
See application file for complete search history.

(56) References Cited

U.S. PATENT DOCUMENTS

| 2,999,707 | A | * | 9/1961 | Kniepkamp | F16F 3/0935 384/909 |
| 4,026,164 | A | * | 5/1977 | Mozingo | B60T 7/045 74/529 |
| 5,649,693 | A | * | 7/1997 | Busby | B62K 25/04 267/141.1 |
| 6,708,370 | B2 | * | 3/2004 | Shih | G06F 1/1679 16/335 |
| 7,047,599 | B2 | * | 5/2006 | Oshima | G06F 1/1616 16/337 |
| 7,275,286 | B2 | * | 10/2007 | Lu | G06F 1/1616 16/335 |
| 8,763,969 | B2 | * | 7/2014 | Wu | F16M 11/10 248/162.1 |
| 2013/0112818 | A1 | * | 5/2013 | Hsu | F16M 11/2021 248/121 |
| 2013/0192406 | A1 | * | 8/2013 | Godowski | B25J 9/106 901/1 |
| 2015/0198414 | A1 | | 7/2015 | Raybman | |
| 2017/0120968 | A1 | | 5/2017 | Povinelli et al. | |

FOREIGN PATENT DOCUMENTS

| DE | 401597 A | 9/1924 | |
| DE | 68904773 T2 | 8/1993 | |
| DE | 102007052468 A1 * | 5/2008 | ......... B60G 21/0551 |
| DE | 102017214769 A1 | 2/2019 | |

(Continued)

*Primary Examiner* — T. Scott Fix
(74) *Attorney, Agent, or Firm* — Dickinson Wright PLLC

(57) ABSTRACT

The invention relates to a lever system for a wheel wind deflector which is fitted to a vehicle, having a first lever and a second lever which are rotatably connected to each other by means of an articulation, wherein the articulation contains at least one ball in a sleeve, a spring and a support, wherein the ball is guided on an outer contour of the second lever.

7 Claims, 5 Drawing Sheets

(56) References Cited

FOREIGN PATENT DOCUMENTS

| | | | |
|---|---|---|---|
| DE | 102018123487 A1 | 3/2020 | |
| EP | 1754926 A2 * | 2/2007 | ............. F16M 11/04 |
| EP | 3669833 A1 * | 6/2020 | ............ A61F 5/0123 |
| GB | 1381114 A | 1/1975 | |
| WO | WO-2009138809 A1 * | 11/2009 | ......... B62D 33/0604 |
| WO | 2017098106 A1 | 6/2017 | |
| WO | 2020079263 A | 4/2020 | |

* cited by examiner

LEVER GEAR FOR A WHEEL WIND DEFLECTOR AND METHOD FOR OPERATING A LEVER GEAR WITH OVERLOAD PROTECTION

CROSS-REFERENCE TO RELATED APPLICATIONS

This application claims priority to German Application No. DE 102020211399.8 filed Sep. 10, 2020 and German Application No. DE 102020215389.2 filed Dec. 4, 2020. The entire disclosure of each of the above applications is incorporated herein by reference.

FIELD OF THE INVENTION

The invention relates to a lever system for a wheel wind deflector having a first lever and a second lever which are rotatably connected to each other by means of an articulation. The invention also relates to a method for operating a lever system for a wheel wind deflector.

BACKGROUND OF THE INVENTION

This section provides information related to the present disclosure which is not necessarily prior art.

PRIOR ART

In order to control individual elements in movable systems, a kinematic arrangement comprising lever mechanisms is generally used.

For example, flaps are adjusted in the outer region of a motor vehicle.

One example is an optimisation of an extendable wheel spoiler, as known from WO 2017 098 106 A1. An aerodynamic wind deflector device for the wheel of a motor vehicle is described, comprising: a on a carrier between a retracted position, in which the deflection wall can be lifted with respect to the carrier in the assembled state, and an extended position, in which the deflection wall is lowered with respect to the carrier. An actuator which is connected to the deflection wall is constructed to move the deflection wall between the retracted position and the extended position.

DE 10 2017 214 769 A1 discloses a displaceable wheel spoiler in which a virtually linear large displacement path is achieved with a displacement guiding of two four-bar linkages which are coupled to each other by means of a common pivot joint. The two four-bar linkages can ensure by being coupled to each other over a wide range of their movement range a linear or virtually linear movement of the leading member which is connected to the leading member connection region.

Such lever systems are generally not protected against overload since an integration of a protection mechanism is costly and therefore not economical. If an overload protection is absolutely necessary, this is generally provided as an individual coupling or integrated in the displacement actuator and thereby requires an additional system or structural spatial requirement with additional complexity. This results either in disadvantages for the function of the component or increased product costs.

US 2015/0 198 414 A1 sets out a lever system for a folding visor of a firearm. The visor arrangements contain a resiliently loaded pivot pin which is configured to pivotably couple an arm to a base. In this instance, a locking position is provided.

DE 401 597 A sets out a lever with a damping element for pivotable components.

DE 689 04 773 T2 sets out a door closure device with lever arms.

WO 2020 079 263 A1 sets out a wind deflector with a lever mechanism, wherein a second lever is articulated to a movable component.

GB 1 381 114 A sets out a locking mechanism in which a resiliently loaded ball which is guided in a sleeve is used.

DE 10 2018 123 487 A1 sets out a resiliently loaded latch coupling which is based on wedges.

SUMMARY OF THE INVENTION

This section provides a general summary of the disclosure, and is not a comprehensive disclosure of its full scope or all of its features.

An object of the invention is to configure a lever drive for a wheel wind deflector having an actuator, wherein an overload protection which enables the cost-effective configuration of a movable system in the case of exceptional events during operation is provided.

The configuration of the overload protection is intended to enable adaptation to different loads and without specific functions of the drive to provide a reversible actuation in the event of a defined force level.

The solution is a lever system for a wheel wind deflector having a first lever and a second lever which are rotatably connected to each other by means of an articulation, wherein the articulation has at least one ball in a sleeve, a spring and a support, wherein the ball has a basic position in a recess of the second lever and in the overload situation can be guided on an outer contour of the second lever.

As a result of this mechanical overload protection, the lever system can give way without any damage occurring.

Advantageously, the first lever comprises two lever arms which are structurally connected to each other by means of a connection clip. The connection clip in this instance acts as a component of a stop.

The first lever is secured to a securing plate so as to be effective in terms of driving. The securing plate is a carrier and serves to receive the components, that is to say, also an actuator, as a connection to a vehicle and as an additional component of a stop.

It is advantageous that the second lever has a guiding path for the ball, which is adapted in a curved form to the outer form of the second lever. The movable component is fitted terminally to the second lever and is rotatably fitted at the other end to a fixed articulation location. Consequently, the articulation can be rotated between the first lever and second lever.

The object is further achieved by a method for operating a lever system for a wheel wind deflector, wherein, in the event of a force occurring on the movable component, the ball is pressed out of the recess on the second lever and the ball runs along a guiding path when the second lever gives way with respect to the first lever.

In this case, this results in a sliding coupling which is activated by means of predetermined forces and which can be moved again into the basic state without maintenance.

After giving way, the lever system is moved into the initial state again by the actuator moving the first lever against a stop.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
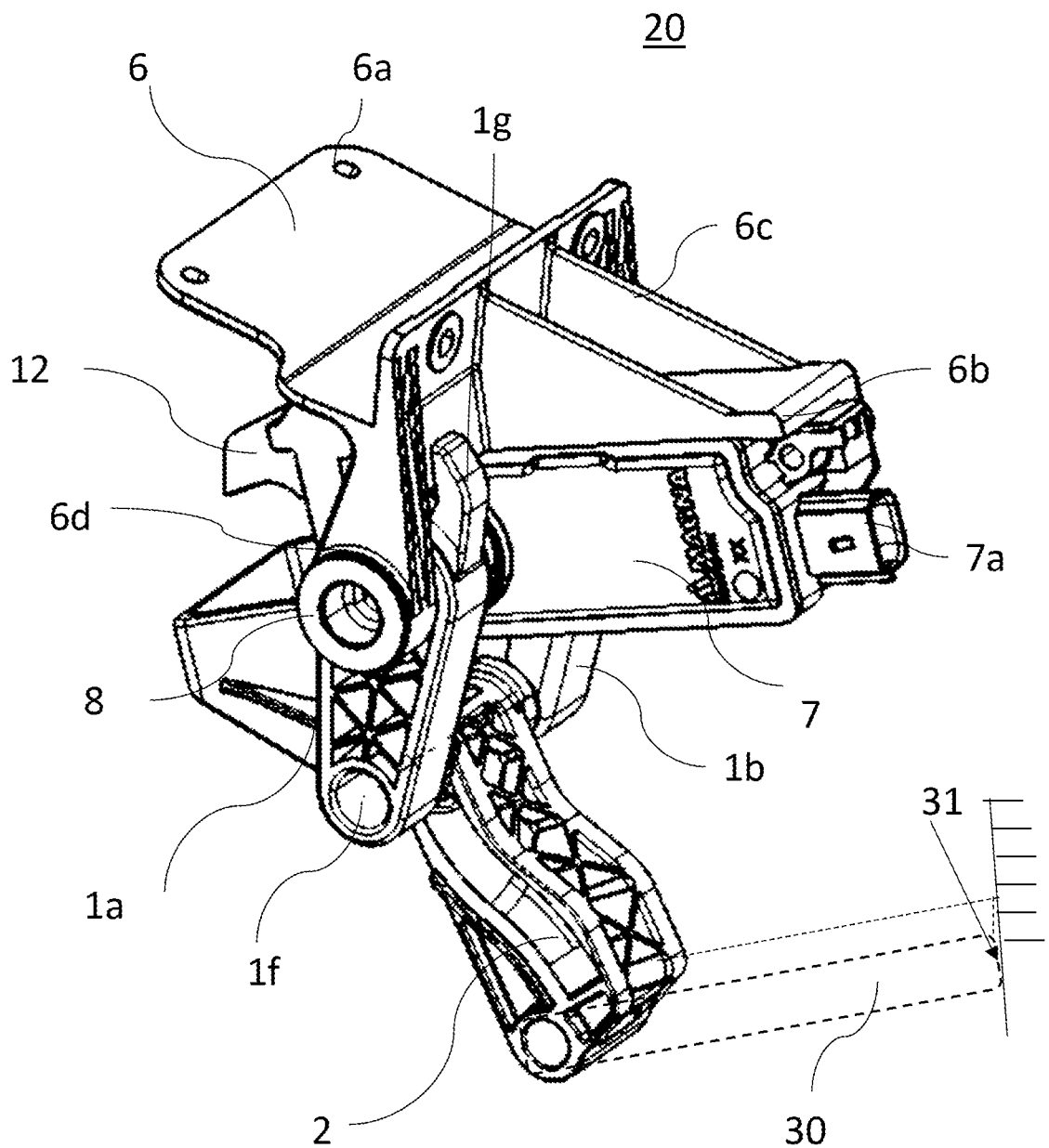
FIG. 1 shows a lever gear during assembly.
Figure 2:
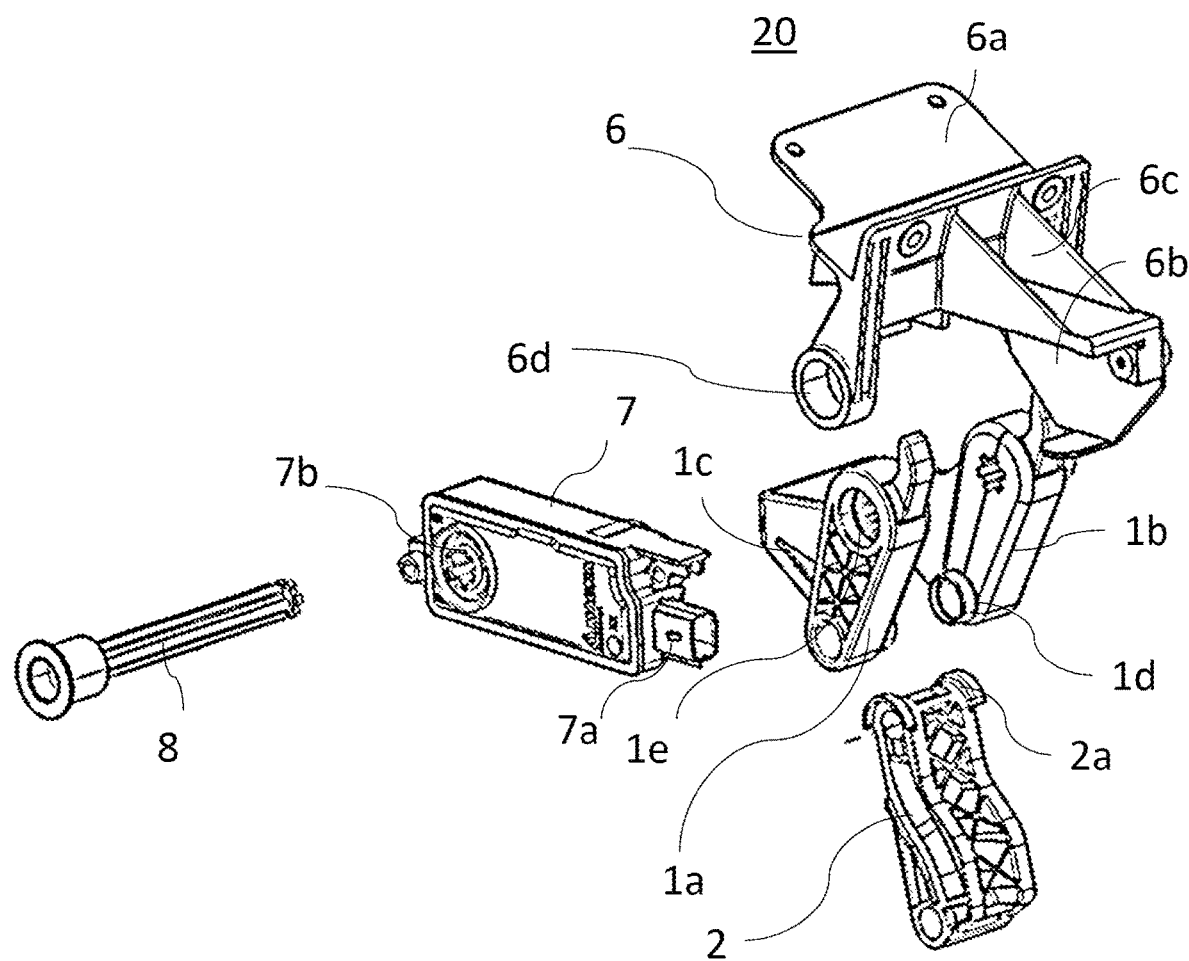
FIG. 2 shows the lever gear in a state disassembled into components.
Figure 3:
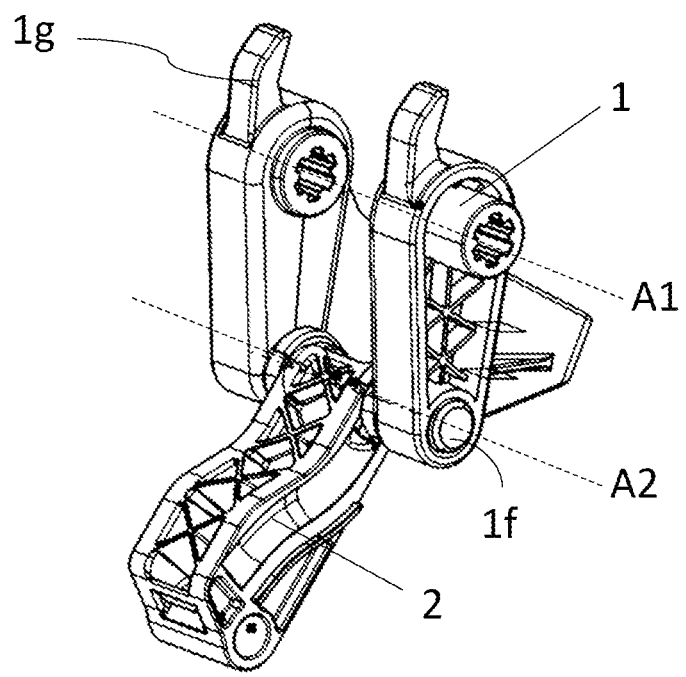
FIG. 3 shows the two levers of the lever gear.

A lever gear 20 comprises a construction which is divided into two pieces with a first lever 1 and a second lever 2. The first lever 1 is secured in an articulated manner to a securing plate 6, which is in turn installed in a vehicle. The securing plate of the embodiment has a part-region 6a for screwing to the vehicle, and a retention member 6b for an actuator 7.

The retention member 6b forms a receiving space for the actuator 7, in which it is inserted, wherein an electrical plug type connector 7a remains accessible. Via ribs 6c, the retention member 6b is connected to the securing plate 6 and stabilised.

The securing plate 6 has on the external extent thereof bearing receiving members 6d which serve to guide a shaft 8.

The actuator is encapsulated and provided with a toothed drive wheel 7b which is located in the housing of the actuator 7.

The first lever 1 comprises two arms 1a and 1b which are structurally connected to each other by means of a connection clip 1c. The two arms 1a and 1b have at one end a continuous inner tooth arrangement 1e and at the other end of the arms an annular support 1d on a through-hole 1f. The support 1d is located between the two arms 1a and 1b and acts as a bearing for the second lever 2 which has half-shell-like caps 2a. Adjacent to the inner tooth arrangement 1e, hook-like continuations 1g are fitted to the respective arms 1a, 1b on the lever 1.

The second lever 2 is connected at the end thereof opposite the caps 2a to a flap, for example, a wheel wind deflector which is not illustrated.

FIG. 1 shows in the assembly that the actuator 7 is inserted into the receiving space of the securing plate. The first lever is mounted inside the securing plate by the shaft 8 being inserted through the bearing receiving members 6d of the securing plate 6, then through the inner tooth arrangement 1e of one arm 1a of the first lever 1, then through the drive wheel 7b of the actuator 7 and the additional inner tooth arrangement 1e of the arm 1b of the lever 1 and the additional bearing receiving member 6d of the securing plate 6.

The lever 2 is placed on the supports 1d of the lever 1 and forms an axle A2.

With the activation of the actuator 7, the lever 1 rotates about the axle A1 formed by the shaft 8 and consequently pivots the lever 2. The component 30 which is fitted to the lever 2 consequently also pivots about an articulation location 31.

If the component, that is to say, for example, the wheel wind deflector, encounters resistance, the overload protection has to respond in order to prevent destruction of the actuator 7 or the lever drive 20 or the wheel wind deflector.

Figure 4:
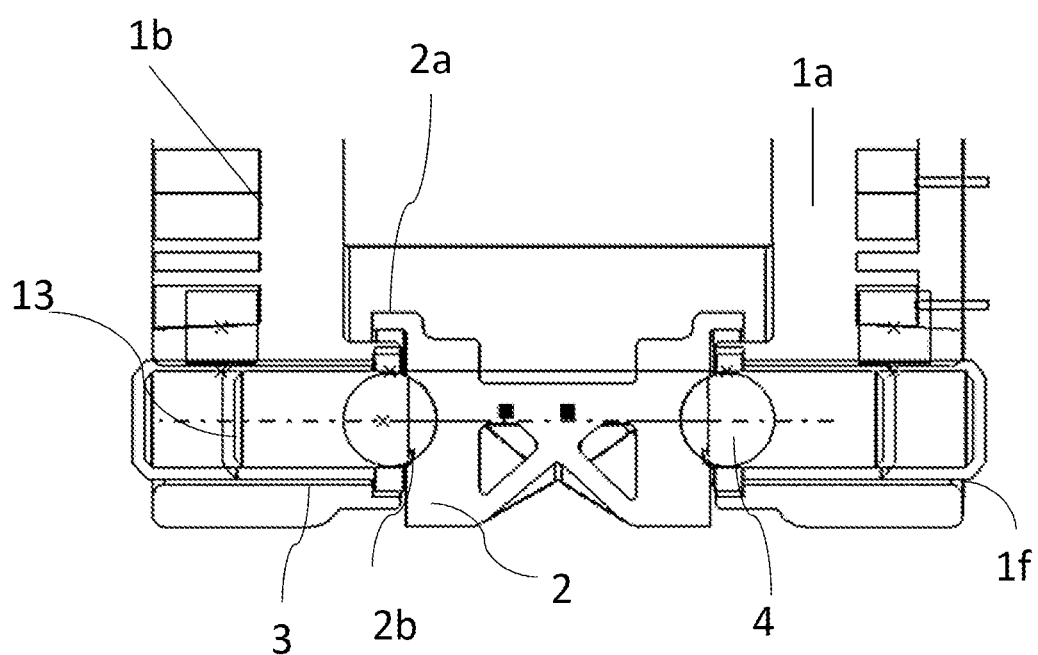
FIG. 4 is a cross-section of the lever gear of a receiving adapter.
Figure 5:
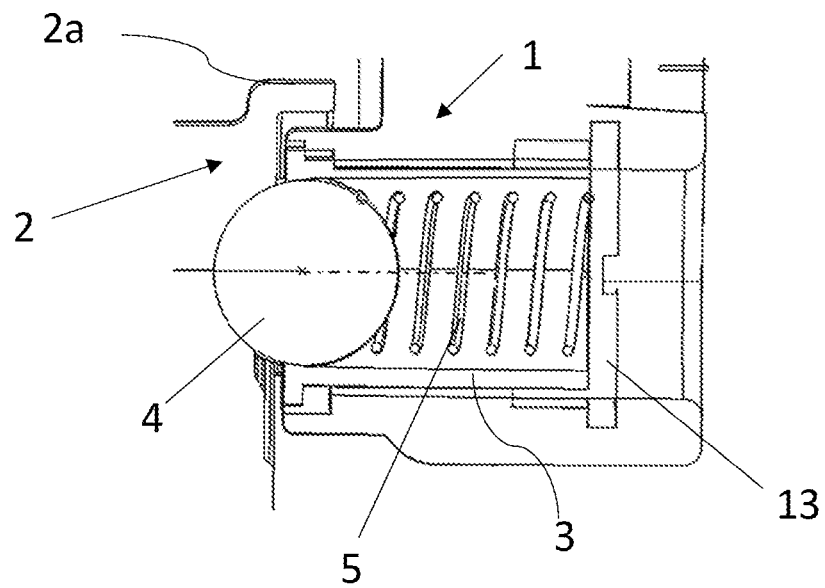
FIG. 5 shows an enlargement of a sleeve.

FIG. 4 shows a section along the axle A2 and shows the connection of the levers 1 and 2. The through-holes 1f of the first lever contains in each case a sleeve 3 which partially surrounds a ball 4 at the end side. The portion of the ball 4 which protrudes from the sleeve 3 rests in a corresponding recess 2b of the second lever 2 in a basic position.

The ball 4 is pretensioned with a spring 5. The spring 5 is supported on a closure piece 13. The resilient loading can in this instance be adjusted by means of the positioning of the closure piece 13 in the sleeve 3.

Alternatively, a single-piece version comprising the sleeve 3 and closure piece 13 can also be installed.

With the connection via the resiliently loaded ball 4, the regular operation is possible within the adjusted pressing pressure. The pressing pressure consequently also defines the basic force B which the actuator has stored as a zero point.

In the case of an overload on the lever 2 when displaced by the actuator 7, a force component is produced in the opposite direction to the basic force B and the ball 4 is thereby pressed out of the recess 2b.

Figure 6:
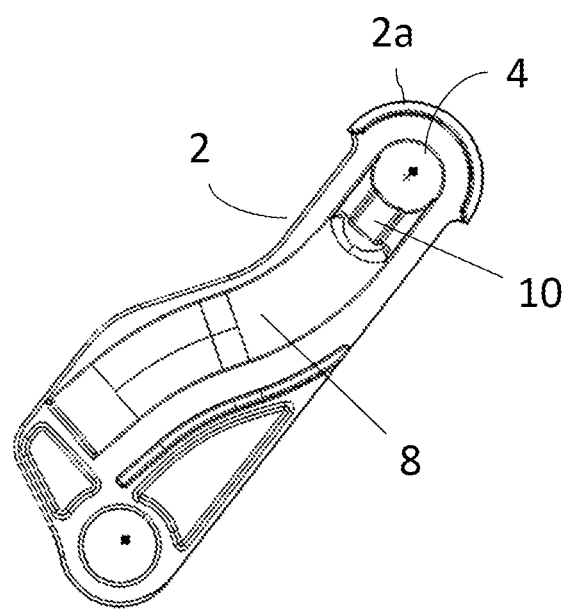
FIG. 6 shows a guiding carriage with roller.
Figure 7:
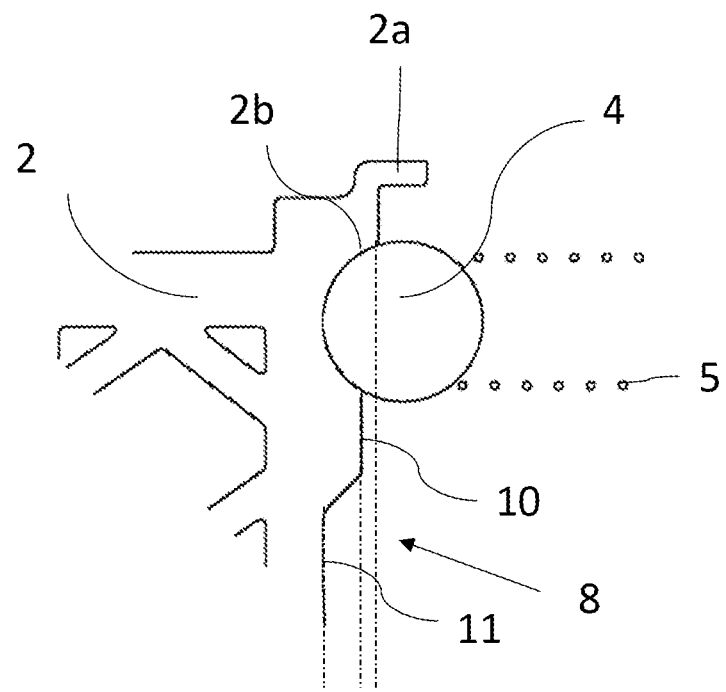
FIG. 7 shows a detail of the lever gear.
Figure 8:
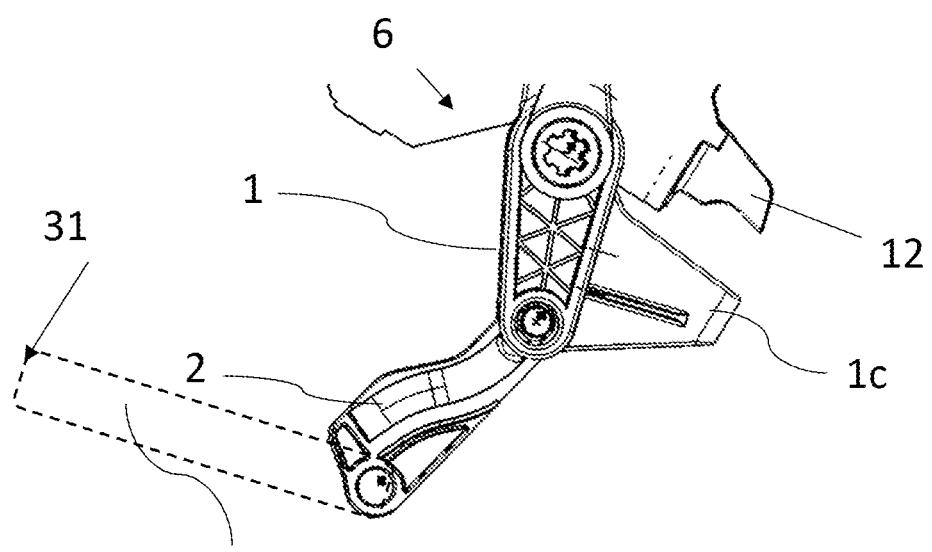
FIG. 8 is a longitudinal section.

As illustrated in FIG. 7, the second lever 2 moves against the ball 4, wherein the ball slides during further movement to the first level 10 of the second lever 2 in order to then slide onto the second level 11 when the second lever further encounters resistance. As a result of the different levels 10 and 11 of the second lever 2, a guiding path 8 for the ball 4 is formed. This extends, as shown in FIG. 6, along the extent of the second lever 2 in a slightly curved form.

If the resistance is so large that the desired force level of the actuation force is reached, therefore, the ball 4 is released into the guide path 8 and enables the second lever 2 to give way with respect to the first lever 1 and thus prevents the system from becoming overloaded. The actuation force is fixedly adjusted beforehand for the actuator in order to protect it from damage.

The force level is in this instance selected to be sufficiently large to achieve a displacement of the lever 1 and to enable the actuator to identify the event.

In order to bring the lever system 20 into the operational state again, the first lever 1 is pivoted with the second lever 2 by the actuator 7 against a stop 12 and the ball 4 is moved via the geometry of the guide path 8 into the provided bearing position in the recess 2b. The stop 12 is in this instance fitted to the securing plate 2 and acts directly on the ball 4.

The actuator identifies the actuation of the overload protection by the rapid displacement of the position, that is to say, by rapidly changing the displacement force.

In order to produce the initial position of the overload protection, the actuator 7 displaces the first lever 1 into the closure position. During the closure operation, the ball 4 is pressed into the recess 2b again.

Finally, the lever system 20 is in the operational basic position again.

The invention claimed is:

1. A lever system for a movable wheel wind deflector which is fitted to a vehicle, the lever system comprising:
   a first lever and a second lever pivotably connected to the first lever at a rotatable connection,
wherein the rotatable connection includes:
a sleeve defining a cavity;
a spring disposed within the cavity of the sleeve:
a ball disposed at least partially within the sleeve and biased in a direction out of the sleeve cavity by the spring;
wherein in a non-overload state the ball is disposed within a recess and held in the recess by the spring, and the rotatable connection defines a first pivot axis between the first and second levers, wherein the first pivot axis extends through the ball and the recess;
wherein in an overload state, in response to resistance on the movable component, the ball is disposed outside of the recess and biased into an outer counter, and the rotatable connection defines a second pivot axis between the first and second levers that is different than the first pivot axis, wherein the second pivot axis extends through the ball and the outer contour;
wherein the ball is guided along the outer contour, and the second pivot axis between the first and the second levers corresponds to the location of the ball within the outer contour.

2. The lever system of claim 1, wherein the first lever includes a pair of arms on opposite sides of the second lever, wherein the arms engage the second lever at the rotational connection.

3. The lever system of claim 2, wherein each of the arms of the first lever includes the sleeve, ball, and spring, and the second lever includes the recess on opposite sides of the second lever, and the second lever further includes the outer contour on opposite sides of the second lever, wherein the sleeves on each of the arms are axially aligned to define the first pivot axis when the ball is within the recess and the second pivot axis when the ball is within the outer contour.

4. The lever system of claim 1, wherein the rotational connection further includes a closure piece disposed within the sleeve that supports the spring at an opposite end relative to the ball, wherein resilient loading of the ball by the spring is adjustable via positioning of the closure piece within the sleeve.

5. The lever system of claim 1, wherein pivotable movement between the first lever and second lever is provided at the first pivot axis when resistance on the moveable component is below a threshold level.

6. The lever system of claim 1, wherein the outer contour defines a curved path along the second lever.

7. The lever system of claim 6, wherein the second lever includes a first level adjacent the recess and a second level adjacent the first level, wherein movement of the ball out of the recess slides the ball to the first level and then to the second level.

* * * * *